Patented May 5, 1936

2,040,033

UNITED STATES PATENT OFFICE 2,040,033

PRODUCTION OF PLASTIC MATERIAL FROM PROTEINS

Oswald Sturken, Leonia, N. J., and John C. Woodruff, Terre Haute, Ind., assignors to Resinox Corporation, New York, N. Y., a corporation of Delaware No Drawing. Application September 1, 1933, Serial No. 687,848

10 Claims. (Cl. 260—2)

Our invention relates to improvements in the production of protein plastics. More specifically, our invention relates to the production of protein plastics which may be cured in the mold without the necessity of a prolonged cure in formaldehyde solution or formaldehyde vapor.

In the past, protein plastics such as casein plastics have found many uses in the light plastics field and have been found to be superior in a number of respects to the other molded products. For example, plastics of this nature are readily machinable, and although water-resistant from a practical standpoint, are sufficiently water-permeable to lend themselves to dyeing operations. Since these plastics are, in general, light colored materials, the advantages of this latter property are apparent.

However, in spite of the many advantages of the protein plastics, these materials have not, up to the present time, enjoyed the economic advantage which they appear at first glance to possess. The reason for this has been primarily the prolonged cure which has been found to be necessary. Casein sheets, for example, are cured over periods of time ranging from a matter of days to a matter of months or even a year. This obviously vastly increases the cost of the plastics. It is necessary to keep a large amount of material on hand, equipment is tied up, and it is impossible to fill rush orders if particular properties are desired which are not possessed by the plastics on hand at the time.

Many attempts have been made to secure a protein plastic which could be cured in a manner so as to obviate the difficulties previously encountered. However, up to the present time, all of these attempts have met with failure. If formaldehyde is mixed directly with the protein in any considerable concentration the reaction is extremely difficult to control and may proceed to an undesirably advanced stage before the plastic is in its final form. Paraformaldehyde has been found to be very difficult to distribute throughout the protein, so that in most cases only local curing is obtained, and a weakened product results. With this material, also, the reaction has been found to be quite difficult to control. If hexamethylenetetramine is employed, a higher temperature is necessary for the cure than is necessary with formaldehyde, and at such temperatures protein plastics have a pronounced tendency to discolor or even to partially decompose. Other formaldehyde-yielding compounds, such as, for example, methylol urea, methylol ethyl urethane, formaldehyde-bisulphite compounds, etc. give final products of low strength, unduly high hydroscopicity, and generally undesirable properties. Unsuccessful attempts have also been made to produce a satisfactory plastic by incorporating with the protein and aldehyde an agent tending to slow up the rate of reaction of the aldehyde and protein. It has therefore been thought necessary to mold the protein without the addition of any formaldehyde compound, and then to cure the molded product either by soaking for a prolonged time in formaldehyde solution or by subjecting the product to the action of formaldehyde vapor for an equally long period of time.

We have now discovered that all of these prior difficulties may be obviated by using as the curing agent an alkyl substituted acrolein, as for example, alpha ethyl beta propyl acrolein. A curing or hardening agent of this type is sufficiently stable to allow its thorough incorporation with the protein and other ingredients of the plastic without materially affecting the plasticity of the mixture. This important property of the curing agent permits the preliminary treatment necessary to the production of a satisfactory plastic, as well as the forming of the plastic into the desired shapes before the final hardening takes place. Our new hardening agent has the further advantage of then bringing about the cure of the protein at temperatures not too high to cause appreciable decomposition or deterioration of the protein.

The protein materials which we have found to be suitable for the present invention are crude proteins free from substantial amounts of carbohydrate or fatty material. For example, we have found corn gluten to be satisfactory if treated to remove the major part of the starch and to either remove or modify the oil content. The starch should preferably be reduced to a concentration of 6% or less, on the weight of the gluten. The oil may be removed by solvent extraction or may be modified by oxidation. The disadvantages of the presence of considerable amounts of carbohydrate or fat in the protein material are the tendency of excess fat to "sweat out" of the molded product and the tendency of either carbohydrate or fat to interfere with the plastifying of the material. Therefore, in the present specification and claims the term "substantially free from carbohydrate and fatty material" is to be understood to mean containing an insufficient amount of such materials to give rise to these difficulties. Various other protein materials of a like degree of purity may, of course, also be employed. Among these may be mentioned casein, zein, albumin, gelatin, and the like.

The process of our invention comprises, essentially, mixing with the protein material a plastifying agent, i. e., water, the alkyl substituted acrolein such as, alpha ethyl beta propyl acrolein, and any modifying agents such as plasticizers, lubricants, pigments, dyes, fillers, and the like, plastifying the mixture, forming the plastified material into sheets, rods, or other suitable forms, and curing. The mixing is preferably carried out in a dough mixer, the plastifying on a rubber mill, and the sheeting out in the usual heated molds or on calenders similar to those used in rubber mills but if desired, the plastifying and sheeting out may be carried out in a single operation on suitable rolls. However, the process is not limited to the use of any particular apparatus and any of the known methods for carrying out these steps of the process may, of course, be employed. When the plastic has attained its final form it is cured by heating, preferably under pressure in a suitable mold.

As will be apparent to one skilled in the art, the time and temperature required for the plastifying and curing will depend to some extent upon the nature of the condensation product employed and the proportion of the components of the plastic. In general, it will be found to be desirable to plastify the mixture at a temperature of 50–100° C., preferably 75–85° C., and to cure at a temperature of 110–150° C., preferably 120–130° C. The time required for both operations will also depend upon the proportions of the ingredients and their reactivity. The nature of the protein material and the water content of the mixture will, of course, also affect the time required for this operation. The time required for the curing will depend upon the rate of reaction between the aldehyde and the protein material. Thus, a more reactive protein such as casein will require slightly less time than a less reactive material such as gluten. In general, it may be stated that from ½–15 minutes for plastifying and from 10–20 minutes for curing will be found to be satisfactory within the temperature ranges previously mentioned.

The particular proportions of ingredients employed will depend to a large extent upon the nature of the products desired. From an economic standpoint, it is desirable to utilize the minimum concentration of aldehyde which will effect the cure of product. However, if certain properties such as extreme water-resistance are desired, it may be found to be necessary to increase the content. The amounts of lubricants or plasticizers employed will depend upon the requirements for machining the product. For example, if the plastic is found to have a tendency to chip during machining, an increase in the plasticizer content will usually avoid this difficulty. Special fillers will be used in the proportions necessary to secure the desired change in the character of the plastic, and pigments, dyes, etc. will be used in the proportions necessary to secure the desired color effect. The proportion of water or other plastifying agent in the mixture will, of course, depend upon the nature of the protein material, the character of final product desired (a final cured product containing at least 10% water being usually desirable), and upon the time the material is to be subjected to heat during plastifying. When water is used as the plastifying agent, from 20–60%, based on the weight of the protein, will usually be found to be satisfactory. For general commercial operation, however, about 22% water or water plus 1% ammonia or acetic acid gives most satisfactory results. In general, it may be said that the proportion of aldehyde to protein material ranging from 1 to 10% will be found to be satisfactory, but that proportions of 2 to 5% will usually be preferable.

The products obtained by the process of our invention are in all cases hard, tough plastics having good strength and elasticity and a satisfactory finish. The materials are sufficiently tough and elastic for machining and show no tendency to gum up the tool when it becomes hot. The appearance of the products will, of course, depend upon the material employed.

*Example I*

The following materials were mixed in a dough mixer:

| | Parts |
|---|---|
| Gluten | 100 |
| Alpha ethyl beta propyl acrolein | 5 |
| Lindol | 2.5 |
| Water | 40 |

After thorough mixing, the composition was milled for 3 minutes at 75° C. on a rubber mill and molded into sheets at 125° C. and 2000 lbs. per sq. in. pressure for 15 minutes. The transverse strength of the resulting plastic was found to be 10,000 lbs. per sq. in. Its water resistance was good.

*Example II*

The following materials were treated as in Example I:

| | Parts |
|---|---|
| Gluten | 100 |
| Alpha ethyl beta propyl acrolein | 5 |
| Lindol | 2.5 |
| Titanium dioxide | 10 |
| Water | 40 |

The properties of the resulting plastic were as follows:

| | |
|---|---|
| Transverse strength | 9000 lbs. per sq. in. |
| Water resistance | medium |
| Color | good |

It is to be understood, of course, that the above examples are illustrative only and are not to be taken as limiting the invention to the particular compounds or proportions specified. For example, proteins other than gluten may be employed, e. g., casein, soy-bean protein, gelatin, albumin, zein, and the like. Plastifying agents other than water may also be used. In general, any material which is either a solvent for the protein or which serves to give a colloidal suspension thereof may be employed. Cresols or phenols, for example, may be used instead of water if the odor of the final product is of little importance. Any of the known modifying agents, i. e., plasticizers such as diethyl phthalate, dibutyl phthalate, lubricants such as zinc stearate, and the like, may be employed in place of or in addition to lindol which was specifically mentioned. Pigments other than titanium dioxide may, of course, also be employed. Such pigments as zinc oxide, titanox, and the like, will be satisfactory, but it is preferable to use titanium dioxide from the standpoint of using a minimum quantity of inert material which tends to weaken the plastic if present in large amounts. Also, the procedures outlined above may, of course, be varied somewhat. For example, instead of curing for a short period of time at elevated temperatures and pressures, the curing may be begun in this manner and completed by heating for a more extended period of time at a lower temperature, say 80° C. Or, in some cases, it may be preferred to carry out the entire curing operation at such a lower temperature. In general, it may be said that known equivalents and any modifications of procedure which would occur to one skilled in the art may be employed without departing from the scope of this invention.

Having now described our invention, what we claim is:

1. In the production of a protein plastic, the steps which comprise mixing together a protein and alpha ethyl beta propyl acrolein $$C_3H_7-CH=C-CHO$$
$$\quad\quad\quad\quad\quad\quad |$$
$$\quad\quad\quad\quad\quad\quad C_2H_5$$

and plastifying the resulting mixture.

2. In the production of a protein plastic, the steps which comprise mixing together a protein and alpha ethyl beta propyl acrolein, $$C_3H_7-CH=C-CHO$$
$$\quad\quad\quad\quad\quad\quad |$$
$$\quad\quad\quad\quad\quad\quad C_2H_5$$

plastifying said mixture, and forming said plastified mixture into suitable shapes.

3. In the production of a protein plastic, the steps which comprise mixing together a protein and alpha ethyl beta propyl acrolein, $$C_3H_7-CH=C-CHO$$
$$\quad\quad\quad\quad\quad\quad |$$
$$\quad\quad\quad\quad\quad\quad C_2H_5$$

plastifying said mixture, forming the said plastified mixture into suitable shapes and curing said shapes.

4. In the production of a protein plastic, the steps which comprise mixing together a protein and alpha ethyl beta propyl acrolein, $$C_3H_7-CH=C-CHO$$
$$\quad\quad\quad\quad\quad\quad |$$
$$\quad\quad\quad\quad\quad\quad C_2H_5$$

plastifying said mixture, forming the said plastified mixture into suitable shapes and curing said shapes at superatmospheric temperatures.

5. In the production of a protein plastic, the steps which comprise mixing a protein with alpha ethyl beta propyl acrolein, $$C_3H_7-CH=C-CHO$$
$$\quad\quad\quad\quad\quad\quad |$$
$$\quad\quad\quad\quad\quad\quad C_2H_5$$

and plastifying the said mixture in the presence of in excess of 20% water.

6. In the production of a protein plastic, the steps which comprise mixing a protein with alpha ethyl beta propyl acrolein, $$C_3H_7-CH=C-CHO$$
$$\quad\quad\quad\quad\quad\quad |$$
$$\quad\quad\quad\quad\quad\quad C_2H_5$$

plastifying said mixture in the presence of in excess of 20% water, forming said plastified mixture into suitable shapes, and curing said shapes.

7. In the production of a protein plastic, the steps which comprise mixing together casein and alpha ethyl beta propyl acrolein, $$C_3H_7-CH=C-CHO$$
$$\quad\quad\quad\quad\quad\quad |$$
$$\quad\quad\quad\quad\quad\quad C_2H_5$$

plastifying said mixture, forming the said plastified mixture into suitable shapes and curing said shapes.

8. In the production of a protein plastic, the steps which comprise mixing together gluten, substantially free from carbohydrate and fatty material, and alpha ethyl beta propyl acrolein, $$C_3H_7-CH=C-CHO$$
$$\quad\quad\quad\quad\quad\quad |$$
$$\quad\quad\quad\quad\quad\quad C_2H_5$$

plastifying said mixture, forming the said plastified mixture into suitable shapes and curing said shapes.

9. In the production of a protein plastic, the steps which comprise mixing together zein and alpha ethyl beta propyl acrolein, $$C_3H_7-CH=C-CHO$$
$$\quad\quad\quad\quad\quad\quad |$$
$$\quad\quad\quad\quad\quad\quad C_2H_5$$

plastifying said mixture, forming the said plastified mixture into suitable shapes and curing said shapes.

10. As a new article of manufacture, a plastic composition formed by the curing of a plastified mixture comprising a protein and alpha ethyl beta propyl acrolein, $$C_3H_7-CH=C-CHO$$
$$\quad\quad\quad\quad\quad\quad |$$
$$\quad\quad\quad\quad\quad\quad C_2H_5$$

OSWALD STURKEN.
JOHN C. WOODRUFF.